(12) United States Patent
Schmidt et al.

(10) Patent No.: US 10,379,248 B2
(45) Date of Patent: *Aug. 13, 2019

(54) MAGNETIC INDUCTION BASED LOCALIZATION FOR WIRELESS SENSOR NETWORKS IN UNDERGROUND OIL RESERVOIRS

(71) Applicants: Saudi Arabian Oil Company, Dhahran (SA); Truva Corporation, Alpharetta, GA (US)

(72) Inventors: Howard K. Schmidt, Dhahran (SA); Ian F. Akyildiz, Alpharetta, GA (US); Shih-Chun Lin, Alpharetta, GA (US); Abdallah Awadh Al-Shehri, Atlanta, GA (US)

(73) Assignees: Saudi Arabian Oil Company, Dhahran (SA); Truva Corporation, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/190,328

(22) Filed: Nov. 14, 2018

(65) Prior Publication Data
US 2019/0101664 A1   Apr. 4, 2019

Related U.S. Application Data

(63) Continuation of application No. 16/012,917, filed on Jun. 20, 2018, now Pat. No. 10,151,851, which is a (Continued)

(51) Int. Cl.
*G01R 33/09* (2006.01)
*G01V 3/28* (2006.01)
*G01V 3/08* (2006.01)

(52) U.S. Cl.
CPC ............... *G01V 3/28* (2013.01); *G01V 3/081* (2013.01)

(58) Field of Classification Search
CPC .... G01R 33/09; G01R 33/096; G01R 33/093; G01R 33/098; G01R 33/0011;
(Continued)

(56) References Cited

U.S. PATENT DOCUMENTS 3,885,212 A * 5/1975 Herbert ............... G01R 15/202
                                              324/117 H
4,023,092 A * 5/1977 Rogers ..................... E21B 31/00
                                              324/221

(Continued)

FOREIGN PATENT DOCUMENTS

EP    2789793 A2    10/2014
WO    2000/23824 A1    4/2000
(Continued)

OTHER PUBLICATIONS

Akyildiz et al.; "SoftWater: Software-Defined Networking for Next-Generation Underwater Communication Systems"; Ad Hoc Networks; vol. 46; Apr. 8, 2016; pp. 1-11.
(Continued)

*Primary Examiner* — Jermele M Hollington
*Assistant Examiner* — Taqi R Nasir
(74) *Attorney, Agent, or Firm* — Fish & Richardson P.C.

(57) ABSTRACT

Example computer-implemented methods, computer-readable media, and computer systems are described for accurate localization of wireless sensor devices in underground oil reservoirs. In some aspects, every sensor measures respective received magnetic field strengths (RMFSs) on a plurality of respective magnetic induction (MI) links and transmits the measured respective RMFSs to at least one anchor devices. A set of distances is determined from the measured
(Continued)

respective RMFSs. The set of distances is processed through an ordered sequence of algorithms, namely weighted maximum likelihood estimation (WMLE), semi-definite programming (SDP) relaxation, alternating direction augmented Lagrangian method (ADM), and conjugate gradient algorithm (CGA), to generate accurate localization of the wireless sensor devices in underground oil reservoirs.

20 Claims, 16 Drawing Sheets

Related U.S. Application Data continuation of application No. 15/486,754, filed on Apr. 13, 2017, now Pat. No. 10,042,077.

(60) Provisional application No. 62/323,103, filed on Apr. 15, 2016.

(58) Field of Classification Search
CPC .... G01R 33/0052; G01R 33/02; G01R 33/07; G01R 19/0092; G01R 33/04; G01R 15/202; G01R 33/0047; G01R 33/075; G01R 33/091
USPC ...... 324/750.21, 754.17, 754.29, 654, 76.75, 324/338, 345, 324, 333, 346, 351, 355, 324/368, 372, 339, 445, 207.15, 331, 464, 324/210–232, 246–263
See application file for complete search history.

(56) References Cited

U.S. PATENT DOCUMENTS

| | | | | |
|---|---|---|---|---|
| 4,983,912 A * | 1/1991 | Roehrlein | ............... | G01R 33/00 324/202 |
| 5,387,863 A * | 2/1995 | Lo | ............... | G01B 7/004 324/207.13 |
| 5,767,668 A * | 6/1998 | Durand | ............... | G01R 1/07 324/117 R |
| 6,853,200 B2 * | 2/2005 | Munser | ............... | F16L 55/48 324/637 |
| 7,622,915 B2 * | 11/2009 | Sugiyama | ............... | G11B 27/36 324/210 |
| 7,831,205 B2 | 11/2010 | Jack et al. | | |
| 7,898,494 B2 * | 3/2011 | Brune | ............... | H01Q 1/04 343/866 |
| 8,229,699 B2 | 7/2012 | Jin | | |
| 2010/0227557 A1 | 9/2010 | Won et al. | | |

FOREIGN PATENT DOCUMENTS

| | | |
|---|---|---|
| WO | 2015086062 A1 | 6/2015 |
| WO | 2015134705 A2 | 9/2015 |

OTHER PUBLICATIONS

Assaf et al., "Accurate Sensors Localization in Underground Mines or Tunnels," IEEE, Published in 2015, 6 pages.

Biswas et al., "Semidefinite Programming Approaches for Sensor Network Localization with Noisy Distance Measurements," IEEE Trans. on Automation Science and Engineering, vol. 3, No. 4, Oct. 2006, pp. 360-371.

Chen et al., "Distributed Source Localization in Wireless Underground Sensor Networks," arXIiv: 1112.4035v1, Dec. 17, 2011, 21 pages.

Costa et al., "Distributed Weighted-Multidimensional Scaling for Node Localization in Sensor Networks," ACM Trans. Sen. Netw., vol. 2, No. 1, Feb. 2006, pp. 39-64.

Ji et al., "Beyond Convex Relaxation: A Polynomial-Time Non-Convex Optimization Approach to Network Localization," Proceedings IEEE INFOCOM, Apr. 2013, pp. 2499-2507.

Kannan et al., "Analysis of Flip Ambiguities for Robust Sensor Network Localization," IEEE Trans. Veh. Technol., vol. 59, No. 4, May 2010, pp. 2057-2070.

Li, "Collaborative Localization with Received-Signal Strength in Wireless Sensor Networks," IEEE Trans. Veh. Technol., vol. 56, No. 6, pp. Nov. 2007, pp. 3807-3817.

Lin et al.; "Magnetic Induction-Based Localization in Randomly-Deployed Wireless Underground Sensor Networks"; IEEE Internet of Things Journal; Jul. 20, 2017; pp. 1-11.

Nie, "Sum of Squares Method for Sensor Network Localization," Computational Optimization and Applications, vol. 43, No. 2, published in 2007, pp. 151-179.

Niewiadomska-Szynkiewicz, "Localization in Wireless Sensor Networks: Classification and Evaluation of Techniques," Int. J. Appl. Mat. Comput. Sci., vol. 22, No. 2, Published in 2012, pp. 281-297.

Simonetto et al., "Distributed Maximum Likelihood Sensor Network Localization," IEEE Transactions on Signal Processing, vol. 62, No. 6, Mar. 15, 2014, pp. 1424-1437.

International Search Report and Written Opinion of the International Searching Authority issued in International Application No. PCT/US2017/027399 dated Aug. 1, 2017; 13 pages.

European Communication Pursuant to Rules 161(1) and 162 EPC issued in European Application No. 17718790.3 dated Nov. 23, 2018, 3 pages.

Gulf Cooperation Council Examination Report issued in GCC Application No. GC 2017-33223 dated Dec. 29, 2018, 4 pages.

* cited by examiner

600

Algorithm 1: ADM (Fast Initial Positioning)

Input : $(A_{ij}, \bar{A}_{ik})$, $(\hat{d}_{ij}^2, \hat{d}_{ik}^2)$
$1 \leq i \leq N, j \in NH_i, 1 \leq k \leq K$

Output: $x_i$, $1 \leq i \leq N$

1 Set $Z^0 \succeq 0$ and $\Lambda^0 \succeq 0$
2 for $m = 0, 1 \ldots$ do
3     Compute $\epsilon^{m+1}$ according to $\epsilon^{m+1} = \epsilon(Z^m, \Lambda^m)$
4     Compute $V^{m+1}$, $U^{m+1}$, and the eigenvalue decomposition of $U^{m+1}$
5     Set $Z^{m+1} = U_+^{m+1}$
6     Compute $\Lambda^{m+1} = \frac{1}{\mu}[A(Z^{m+1}) - V^{m+1}]$
7 end

FIG. 6

Algorithm 2: CGA (Fine-Grained Positioning)

Input : $f(\cdot)$ from $f(X) = \sum \left[ \hat{d}_{ij}^2 - (x_i - x_j)^T (x_i - x_j) \right]^2$
$+ \sum \left[ \hat{d}_{ik}^2 - (x_i - x_k)^T (x_i - x_k) \right]^2$,
$X^{(0)} := [x_1^T, \ldots, x_N^T]^T$ from Algorithm 1

Output $X^*$ % Sensor location

1 Set $m = 0$; compute $d^{(0)} = -\nabla f(X^{(0)})$
2 while $\nabla f(X^{(m)}) \neq 0$ do
3    Compute $\alpha_m$ according to $\alpha_m = \arg\min_{\alpha \geq 0} f(X^{(m)} + \alpha d^{(m)})$
4    Compute $X^{(m+1)}$ according to $X^{(m+1)} = X^{(m)} + \alpha_m d^{(m)}$
5    Compute $\beta_m$ according to $\beta_m = \dfrac{\nabla f(X^{(m+1)})^T \nabla f(X^{(m+1)})}{\nabla f(X^{(m)})^T \nabla f(X^{(m)})}$
6    Compute $d^{(m+1)}$ according to $d^{(m+1)} = -\nabla f(X^{(m+1)}) + \beta_m d^{(m)}$
7    Set $m = m + 1$
8 end
9 Set $X^* = X^{(m)}$

FIG. 8

MAGNETIC INDUCTION BASED LOCALIZATION FOR WIRELESS SENSOR NETWORKS IN UNDERGROUND OIL RESERVOIRS

CROSS-REFERENCE TO RELATED APPLICATIONS

This application is a continuation of and claims the benefit of priority to U.S. patent application Ser. No. 16/012,917, filed Jun. 20, 2018, which is a continuation of U.S. patent application Ser. No. 15/486,754, filed on Apr. 13, 2017, which claims priority to U.S. Provisional Patent Application Ser. No. 62/323,103, filed on Apr. 15, 2016, the contents of which are hereby incorporated by reference.

TECHNICAL FIELD

This disclosure relates to implementing wireless sensor devices in underground oil reservoirs.

BACKGROUND

Wireless underground sensor networks (WUSNs) are networks of wirelessly-interconnected sensor nodes deployed in a variety of underground environments, such as soil, underground tunnels, and oil reservoirs. WUSNs can enable a wide range of emerging applications, such as mine and tunnel disaster prevention, oil gas extraction, underground power grid monitoring, earthquake and landslide forecast, border patrol and security, underground animal tracing, and many more other applications. Most of the applications require the knowledge of location information of the randomly deployed sensor nodes. However, the underground environments prevent the direct application of the conventional localization solutions based on the propagation properties of electromagnetic (EM) waves because of the extremely short communication ranges, highly unreliable channel conditions, and large antenna sizes.

SUMMARY

This disclosure relates to localization of wireless sensor devices in underground oil reservoirs.

In general, example innovative aspects of the subject matter described here can be implemented as a computer-implemented method, implemented in a computer-readable media, or implemented in a computer system, for establishing a magnetic induction (MI) based localization framework in underground oil reservoirs.

One example method includes measuring, by each of a plurality of sensors in a wireless underground sensor network (WUSN) in a hydrocarbon reservoir, respective received magnetic field strengths (RMFSs) on a plurality of respective MI links forming an MI network linking the plurality of sensors and at least two anchor devices to each other, the plurality of sensors being disposed at respective sensor locations within the hydrocarbon reservoir, the at least two anchor devices being disposed at respective anchor device locations on a dipole antenna inside the hydrocarbon reservoir, and locations of the at least two anchor devices being known; transmitting, by each of the plurality of sensors based on magnetic induction, the respective RMFSs to at least one anchor device over the MI network; determining a set of distances from the received RMFSs, the determined set of distances representing an estimate of distances between the respective sensor locations of the plurality of sensors and the respective anchor device locations of the at least two anchor devices in the WUSN; establishing an MI-based localization framework by applying a sequence of algorithms to the determined set of distances and the known locations of the at least two anchor devices; after establishing the MI-based localization framework, determining a first set of sensor locations, the determined first set of sensor locations representing a first estimate of locations of the respective sensor locations within the hydrocarbon reservoir; and after determining the first set of sensor locations, determining a second set of sensor locations based on the determined first set of sensor locations, the determined second set of sensor locations representing a second estimate of locations of the respective sensor locations within the hydrocarbon reservoir.

This, and other aspects, can include one or more of the following features. Applying the sequence of algorithms can include first applying a weighted maximum likelihood estimation (WMLE) and then applying a semi-definite programming (SDP) relaxation to the determined set of distances and the known locations of the at least two anchor devices. Determining the first set of sensor locations can include applying an alternating direction augmented Lagrangian method (ADM) to the established MI-based localization framework. Determining the second set of sensor locations can include applying a conjugate gradient algorithm (CGA) to the determined first set of sensor locations. The first estimate of locations can be a coarse estimate while the second estimate of locations can be a fine estimate. The determined second set of sensor locations can be more accurate than the determined first set of sensor locations. Determining the set of distances from the received RMFSs can be based on an MI-based communication channel model.

In some aspects, the dipole antenna is disposed inside a drilling well on the hydrocarbon reservoir. One anchor device is placed on top of the dipole antenna inside the hydrocarbon reservoir and another anchor is placed on bottom of the dipole antenna inside the hydrocarbon reservoir.

Another computer-implemented method includes determining a set of distances between respective sensor locations of a plurality of sensors and respective anchor device locations of at least two anchor devices in a WUSN in a hydrocarbon reservoir, the plurality of sensors being disposed at the respective sensor locations within the hydrocarbon reservoir, the at least two anchor devices being disposed at the respective anchor device locations on a dipole antenna inside the hydrocarbon reservoir, and locations of the at least two anchor devices being known; establishing an MI-based localization framework by applying a sequence of algorithms to the determined set of distances and the known locations of the at least two anchor devices; after establishing the MI-based localization framework, determining a first set of sensor locations, the determined first set of sensor locations representing a first estimate of locations of the respective sensor locations within the hydrocarbon reservoir; and after determining the first set of sensor locations, determining a second set of sensor locations based on the determined first set of sensor locations, the determined second set of sensor locations representing a second estimate of locations of the respective sensor locations within the hydrocarbon reservoir.

Other implementations of this aspect include corresponding computer systems, apparatuses, and computer programs recorded on one or more computer storage devices, each configured to perform the actions of the methods. A system of one or more computers can be configured to perform particular operations or actions, by virtue of having software, firmware, hardware, or a combination of software, firmware, or hardware installed on the system that, in operation, causes the system to perform the actions. One or more computer programs can be configured to perform particular operations or actions by virtue of including instructions that, when executed by data processing apparatus, cause the apparatus to perform the actions.

For example, a system comprising a WUSN that includes a plurality of sensors and at least two anchor devices in the WUSN in an underground region. Each of the at least two anchor devices can include memory and data processing apparatus configured to perform the earlier-mentioned, computer-implemented method. Each of the sensors can include memory and data processing apparatus configured to measure respective RMFSs on a plurality of respective MI links forming an MI network linking the plurality of sensors and the at least two anchor devices to each other; and transmit, based on magnetic induction, the respective RMFSs to at least one anchor device over the MI network.

The foregoing and other implementations can each, optionally include one or more of the following features, alone or in combination:

In some aspects, where applying the sequence of algorithms can include first applying a WMLE and then applying a SDP relaxation to the determined set of distances and the known locations of the at least two anchor devices.

In some aspects, where determining the first set of sensor locations can include applying an ADM to the established MI-based localization framework.

In some aspects, where determining the second set of sensor locations can include applying a CGA to the determined first set of sensor locations.

In some aspects, the first estimate of locations can be a coarse estimate while the second estimate of locations can be a fine estimate.

In some aspects, the determined second set of sensor locations can be more accurate than the determined first set of sensor locations.

In some aspects, the dipole antenna is disposed inside a drilling well on the hydrocarbon reservoir.

In some aspects, one anchor device is placed on top of the dipole antenna inside the hydrocarbon reservoir and another anchor is placed on bottom of the dipole antenna inside the hydrocarbon reservoir.

In some aspects, the determined set of distances is based on an MI-based communication channel model.

Each of the aspects described in this disclosure can be combined with one or more of any of the other aspects described in this disclosure.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description in the following. Other features and advantages of the disclosure will be apparent from the description and drawings, and from the claims.

BRIEF DESCRIPTION OF THE DRAWINGS

FIG. 6 is a diagram showing an example ADM-based fast initial positioning algorithm.

FIG. 8 is a diagram showing an example CGA-based fine-grained positioning algorithm.

Like reference numbers and designations in the various drawings indicate like elements.

DETAILED DESCRIPTION

Figure 1:
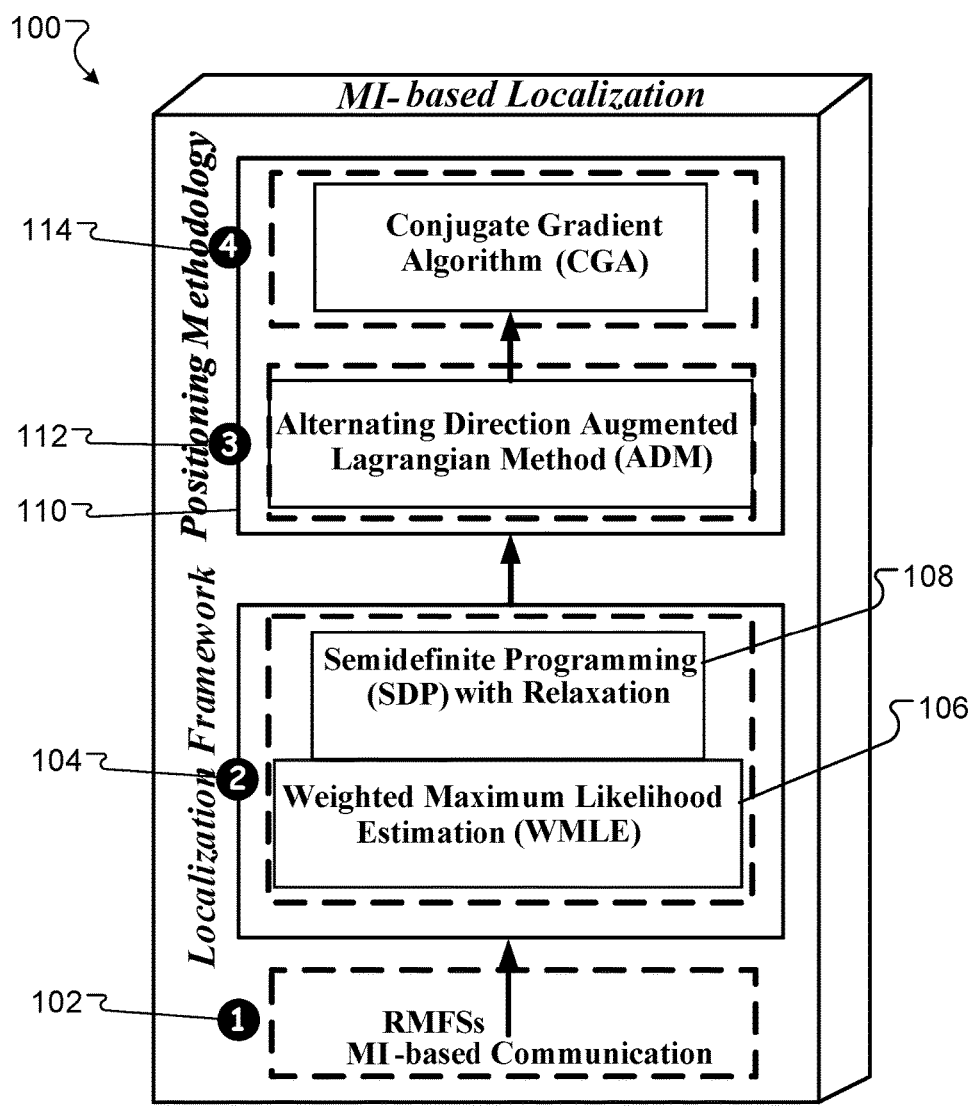
FIG. 1 is a diagram showing an example architecture of the magnetic induction (MI) based localization system design.

This disclosure describes computer-implemented methods, software, and systems for providing accurate localization of wireless sensor devices in wireless underground sensor networks (WUSNs), for example, in underground oil reservoirs.

Underground environments create significant challenges for providing accurate localization of wireless sensor devices using wireless communication via classical electromagnetic (EM) waves. For example, the main problems of EM communication arise from extremely short communication ranges, highly unreliable channel conditions, and large antenna sizes, thus making them impractical for actual deployments of WUSNs.

The magnetic induction (MI) based communication is an alternative wireless communication solution to handle the underground challenges. The MI-based communication utilizes the near magnetic field of coils to propagate the information, thus achieving constant channel conditions via small-size coils and making the MI-based communication suitable for underground environments.

In some implementations, the MI-based communication has unique multi-path and fading-free propagation properties. The distance estimation between two coils can be derived from received magnetic field strengths (RMFSs) based on an MI-based communication channel model. For example, since MI-based communication is affected by a few environmental parameters, the path-losses and thus RMFS measurements are a function of operating temperature T, electrical permittivity of medium ε, and magnetic permeability of medium μ. Using the MI-based communication channel model, the estimated distance between transmitter and receiver coils can be identified from the RMFS measurements. This disclosure applies this estimation methodology to obtain estimated distances between pair-wise sensors and between sensors and anchor devices.

In some implementations, an MI-based localization framework can be established based on the unique multi-path and fading-free propagation properties of the MI-based communication. For example, this disclosure describes a joint weighted maximum likelihood estimation (WMLE) and semi-definite programming (SDP) relaxation problem for the MI-based localization framework. In the distance estimation described earlier, the most possible estimation error comes from background noises and can be modeled as Gaussian random variables. Based on this assumption, this disclosure describes a WMLE to minimize the distance estimation error. A SDP relaxation is further described to reformulate the WMLE problem into a convex relaxation problem.

In some implementations, accurate sensor positioning information can be determined from the MI-based localization framework. For example, this disclosure describes a fast and efficient positioning algorithm, called alternating direction augmented Lagrangian method (ADM), to provide initial results of sensor locations from the SDP problem described earlier. The ADM requires less computation and storage, and can take advantage of problem structures such as sparsity. This makes it more suitable and sometimes the only practical choice for solving large-scale SDPs. This disclosure also describes a fine-grained positioning algorithm, called conjugate gradient algorithm (CGA), to enhance localization accuracy from the initial results of sensor locations in a time-efficient manner.

The example MI-based localization can achieve one or more advantages. For example, the unique multi-path and fading-free propagation properties make MI-based communication suitable for underground environments, for example, underground oil reservoirs. The example MI-based localization can provide unknown sensor locations, in randomly-deployed wireless sensor networks, in underground environments. The example MI-based localization can derive estimated distances, between pair-wise sensors and between sensors and anchor devices, with great accuracy from RMFS measurements using the unique multi-path and fading-free propagation properties of the MI-based communication. The example MI-based localization can develop an MI-based localization framework to incorporate WMLE and SDP relaxation techniques for robust localization in underground environments. The example MI-based localization proposes both fast initial positioning and fine-grained positioning to realize the MI-based localization framework in a fast and accurate manner in both low and high noise regimes, under different underground environment settings. As a result, the example MI-based localization is applicable to general wireless underground applications, with various network topologies, and different environment constraints. In some applications, the example MI-based localization can achieve additional or different advantages.

FIG. 1 is a diagram showing an example architecture 100 of the MI-based localization system design. The MI-based localization architecture 100 includes measuring RMFSs on MI-based communication links 102 in an underground oil reservoir environment. Distance estimation of the MI-based communication links is determined from the measured RMFSs based on an MI-based communication channel model. A localization framework 104 is established as a problem formulation of joint WMLE 106 and SDP relaxation 108 for accurate sensor positioning from the distance estimation. A positioning methodology 110 can be performed on the localization framework 104 to enhance localization accuracy. The positioning methodology 110 includes an efficient fast initial positioning algorithm (for example, ADM 112) to provide initial results of sensor locations. The positioning methodology 110 also includes a fine-grained positioning algorithm (for example, CGA 114) performed on the initial results to enhance localization accuracy in a time-efficient manner.

Figure 2:
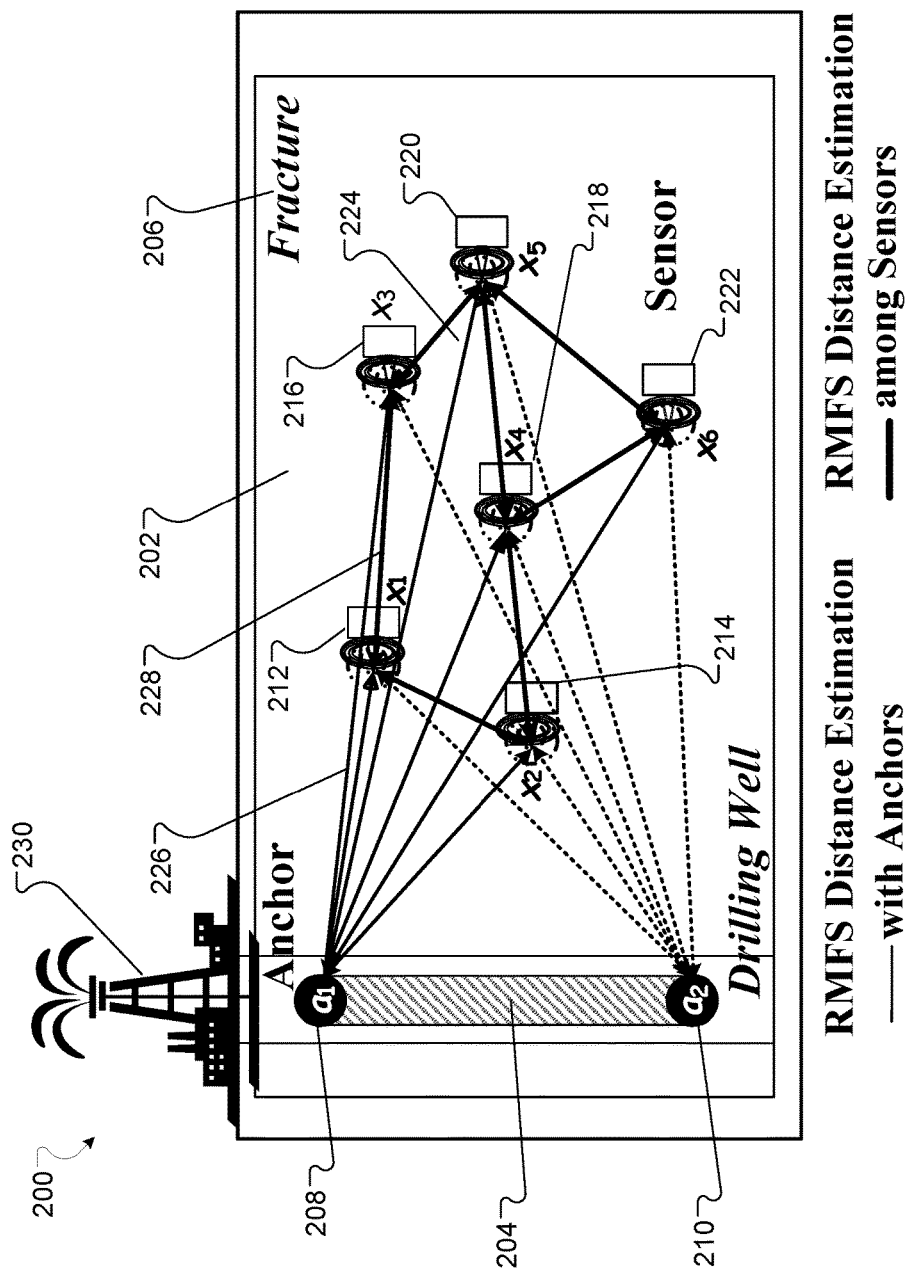
FIG. 2 is a plot showing an example system model of MI-based communication for wireless underground sensor networks (WUSNs) in underground oil reservoirs.

FIG. 2 is a plot showing an example system model 200 of MI-based communication for WUSNs in underground oil reservoirs 202. In some implementations, a well system 230 can be implemented on the land in a subterranean region, for example, to perform fracture treatments in order to produce oil and gas from underground oil reservoirs 202. A drilling well 204 can be formed beneath the well system 230 and fractures 206 can be formed in the underground oil reservoirs 202. In some implementations, two anchor devices (for example, anchor device 208 ($a_1$) and anchor device 210 ($a_2$)) can be placed in a dipole antenna disposed inside the drilling well 204. Anchor device 208 ($a_1$) is positioned on top of the dipole antenna and anchor device 210 ($a_2$) is positioned on bottom of the dipole antenna. In some implementations, locations of anchor device 208 ($a_1$) and anchor device 210 ($a_2$) are known. In some implementations, fewer or more anchor devices are disposed.

Multiple miniaturized sensors (for example, sensor 212 ($X_1$), sensor 214 ($X_2$), sensor 216 ($X_3$), sensor 218 ($X_4$), sensor 220 ($X_5$), and sensor 222 ($X_6$)) can be placed in the underground oil reservoirs 202 that form one or more WUSNs for measuring conditions of the underground environment. The sensors can measure temperature, pressure, local fluid composition, chemical compositions, or other environment information of the underground oil reservoirs 202. Some or all of environment information, as well as the sensor location information, can be communicated over the WUSN among the multiple sensors or to the anchor devices or both, for example, based on MI communications. The sensor location information can be used for mapping the fractures 206 of the underground oil reservoirs 202. The MI communication network 224 can include MI communication links between anchor devices and sensors (for example, an MI communication link 226) and MI communication links between neighboring sensors (for example, an MI communication link 228). The MI communications can include single-hop and multi-hop transportations. For example, an end-to-end MI transmission can include more than two sensors along the transmission route.

Each sensor can include memory, a processor, or other computer-readable media or data processing apparatus operable to perform the example technique for estimating link distances from RMFS measurements. For example, the sensors can include memory and processors for performing the example process 300 in a distributive manner. In some implementations, the sensors in the WUSN can include communication interfaces for establishing communications (for example, radio frequency communications or Bluetooth communications) with a computer system of the well system 230. The computer system can be located near the underground oil reservoirs 202 or remotely in a computing center or facility. In some implementations, each anchor device can include memory, a processor, or other computer-readable media or data processing apparatus operable to perform the example techniques for providing accurate localization of wireless sensor devices in the WUSN in the underground oil reservoirs 202. For example, the anchor devices can include memory and processors for performing the example processes 300, 400, 500, and 700. In some implementations, the anchor devices can include communication interfaces for establishing communications (for example, radio frequency communications or Bluetooth communications) with the computer system of the well system 230. In some implementations, some or all of the example techniques described in this disclosure (for example, the example processes 300, 400, 500, and 700) can be implemented by the computer system in a centralized manner.

In some implementations, sensors are randomly deployed in reservoir fracture 206 and two anchor devices exist as reference points for localization. The MI communication link is formed by the induction between the primary and secondary coils, as an alternating current exists in the primary coil. In some implementations, each sensor or each anchor device, or both in the WUSN can include, be attached to, or otherwise be associated with, a coil as an antenna for MI communication. For example, a sensor (or an anchor device or both) can be an integrated sensor (or an integrated anchor device or both) that has an embedded coil antenna or a sensor (or an anchor device or both) with external (attached) coils. In some implementations, the anchor devices are disposed on large dipole antennas inside the drilling well 204 to communicate with sensors. The information collected by sensors can be sent back to the anchor devices through multi-hop communications.

Figure 3:
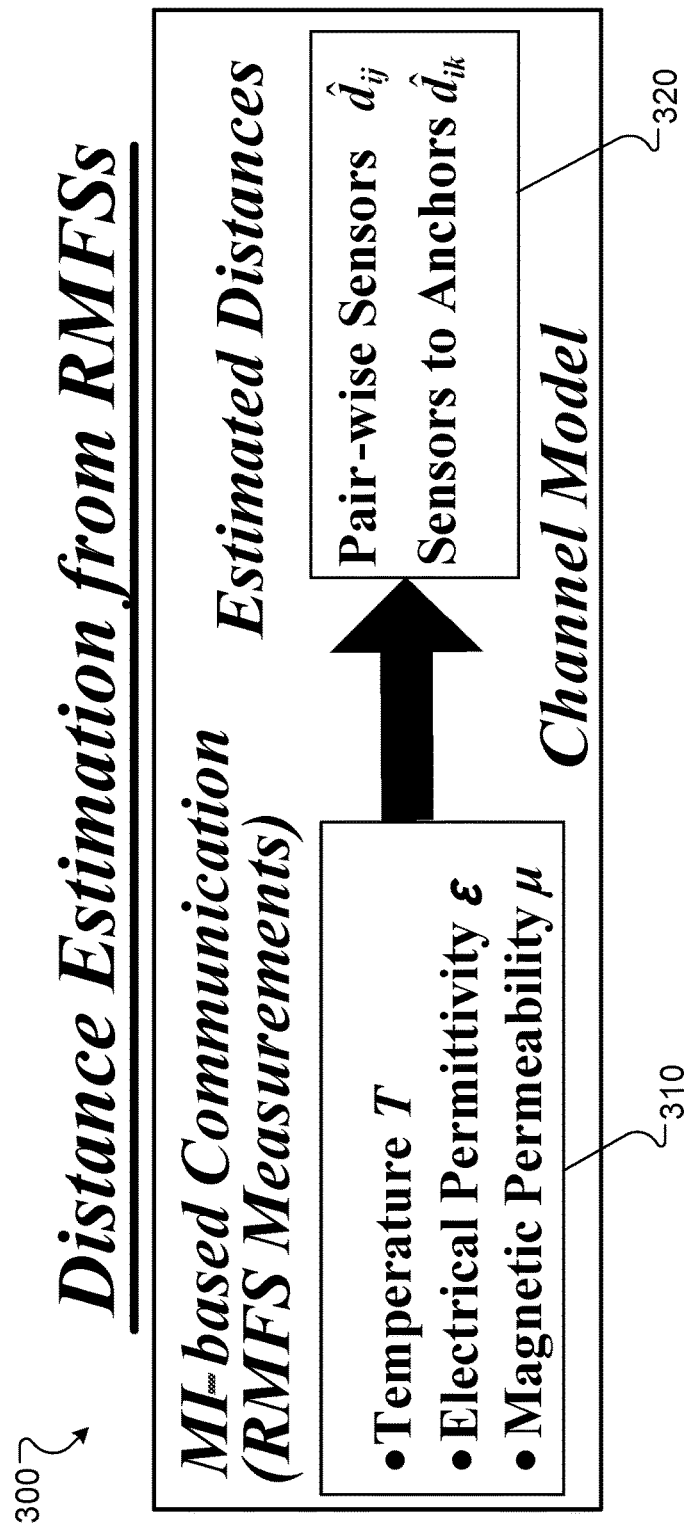
FIG. 3 is a flow chart of an example process of distance estimation from received magnetic field strength (RMFS) measurements.

In some implementations, the network model is abstracted mathematically as follows. Without loss of generality, a WUSN consists N sensors with random positions denoted by the set $\{x_i \in \mathbb{R}^n : 1 \le i \le N\}$ (or the matrix $X_{n \times N} := [X_1, \ldots, X_N]$) and two anchors with known positions denoted by the set $\{a_k \in \mathbb{R}^n : 1 \le k \le 2\}$. In addition, through the establishment of channel models for MI-based communications (described with FIG. 3), two types of information are available when designing localization systems. In particular, as shown in FIG. 3, the channel models provide the estimated distances among sensors (for example, $\hat{d}_{ij}$, $1 \le i \le N$ and $j \in NH_i$, where $NH_i$ denotes the neighbor set of sensor i) and between anchor devices and sensors (for example, $\hat{d}_{ik}$, $1 \le i \le N$ and $1 \le k \le K$) from the respective RMFS. In some implementations, anchor devices support flexible design to enable communication in large transmission ranges. As a result, direct communication links exist for each anchor device to every sensor. This disclosure describes a localization system that provides unknown sensor locations according to the given anchor devices locations and the estimated distances between sensors and between anchor devices and sensors. In some implementations, the localization system can be implemented in a local or remote computing control center, which connects to at least one anchor device.

FIG. 3 is a diagram of an example process 300 of distance estimation from RMFS measurements. In some implementations, RMFS measurements 310 include measurements of temperature T, electrical permittivity ε, magnetic permeability μ, or other environment conditions or parameters of a WUSN in an underground oil reservoir. In some implementations, distances 320 between sensors and between anchor devices and sensors can be estimated from the RMFS measurements through an MI-based communication channel model.

The MI-based communication enjoys unique multi-path and fading-free propagation properties. As a result, the distance estimation between two coils can be determined from RMFSs based on the MI-Based communication channel model (described later). In particular, as MI-based communication is affected by few environmental parameters, the path-losses and thus RMFS measurements are the function of the operating temperature T, electrical permittivity of medium ε, and magnetic permeability of medium μ. In addition, by applying the MI-Based communication channel model, the distance between transmitter and receiver coils can be uniquely identified from the RMFS measurements. This estimation methodology can be applied to obtain the estimated distances between pair-wise sensors $\hat{d}_{ij}$ and between sensors and anchor devices $\hat{d}_{ik}$.

With MI communication, data information is carried by a time varying magnetic field. Such a magnetic field is generated by a modulated sinusoid current along an MI coil antenna at the transmitter. The receiver retrieves the information by demodulating the induced current along the receiving coil antenna. Since the magnetic field does not exhibit multipath behavior, given the RMFS, the distance between the transmitter and receiver can be uniquely estimated with regards to Additive White Gaussian Noise (AWGN) channels in MI-based communication. Specifically, transformer circuit models can be applied to accurately obtain the path loss of MI-based communication, thus providing required estimated distances for localization systems. The details are in the following.

For MI channels, the following relationship exists between the RMFS and transmitted power:

$$10^{\frac{P_r}{10}} = 10^{\frac{P_t - L_{MI}}{10}} + W, \qquad (1)$$

where $P_r$ [Decibel milliwatts or dBm] and $P_t$ [dBm] are the RMFS and transmitted power, respectively; $L_{MI}$ [Decibel or dB] is the path loss; W is a zero mean Gaussian distributed random variable with standard deviation σ and accounts for the background noise. With m collected RMFS measurements (that is, $P_{r1}, \ldots, P_{rm}$), Eq. (1) implies that these measurements are independent and identically distributed (i.i.d.) Gaussian variable with mean θ and variance $\sigma^2$, and yields the likelihood function for RMFS, that is, the mean, as $$L(\theta | P_{r1}, \ldots, P_{rm}) = \prod_{i=1}^{m} \frac{\exp(-(P_{ri} - \theta)^2 / 2\sigma^2)}{\sqrt{2\pi\sigma^2}}. \qquad (2)$$

Considering the maximum likelihood estimate of θ, where $(d/d\theta)\log L(\theta|P_{r1}, \ldots, P_{rm})|\hat{\theta}_{ML} = 0$, the following can be derived:

$$\hat{\theta}_{ML} = \frac{1}{m}\sum_{i=1}^{m} P_{ri}. \qquad (3)$$

With this unbiased estimator, the transmission distance can be uniquely estimated from the MI path loss model and is derived as:

$$\hat{d} = \arg\left\{d \left| \left(10^{\frac{P_t - \hat{\theta}_{ML}}{10}} - 1\right) = \frac{16 R_0^i(T) R_0^r(T) d^3}{\omega^2 \mu^2(T) N_t N_r a_t^3 a_r^3 G^2(\sigma(T,\varepsilon),\omega,d)} \right.\right\}, \quad (4)$$

where $\omega$ is the operating angular frequency, $\mu$ [Henry per meter or H/m] the magnetic permeability, T [Kelvin or °K] the working temperature, $\varepsilon$ [Farads per meter or F/m] the electrical permittivity, $\sigma$ [Siemens per meter or S/m] the electrical conductivity, $G(\bullet)$ an additional loss factor from the skin depth effect, $N_i$ ($N_j$) number of turns of the transmitter i (receiver j) coil, $a_i$ ($a_j$) [Centimeter or cm] the radius, and $R_0^i$ ($R_0^j$) [Ohm per meter or $\Omega$/m] unit length resistance. Eq. (4) comes from the fact that as the transmission distance d increases, RMFS decreases with a rate of ($1/d^3$). In the 2D oil reservoir environment, the angle between the transmitter (receiver) coil radial and the line connecting two coils becomes zero. The MI-based localization exploits this unique multi-path fading-free propagation property of MI-based signals to provide accurate, simple, and convenient localization algorithms.

Figure 4:
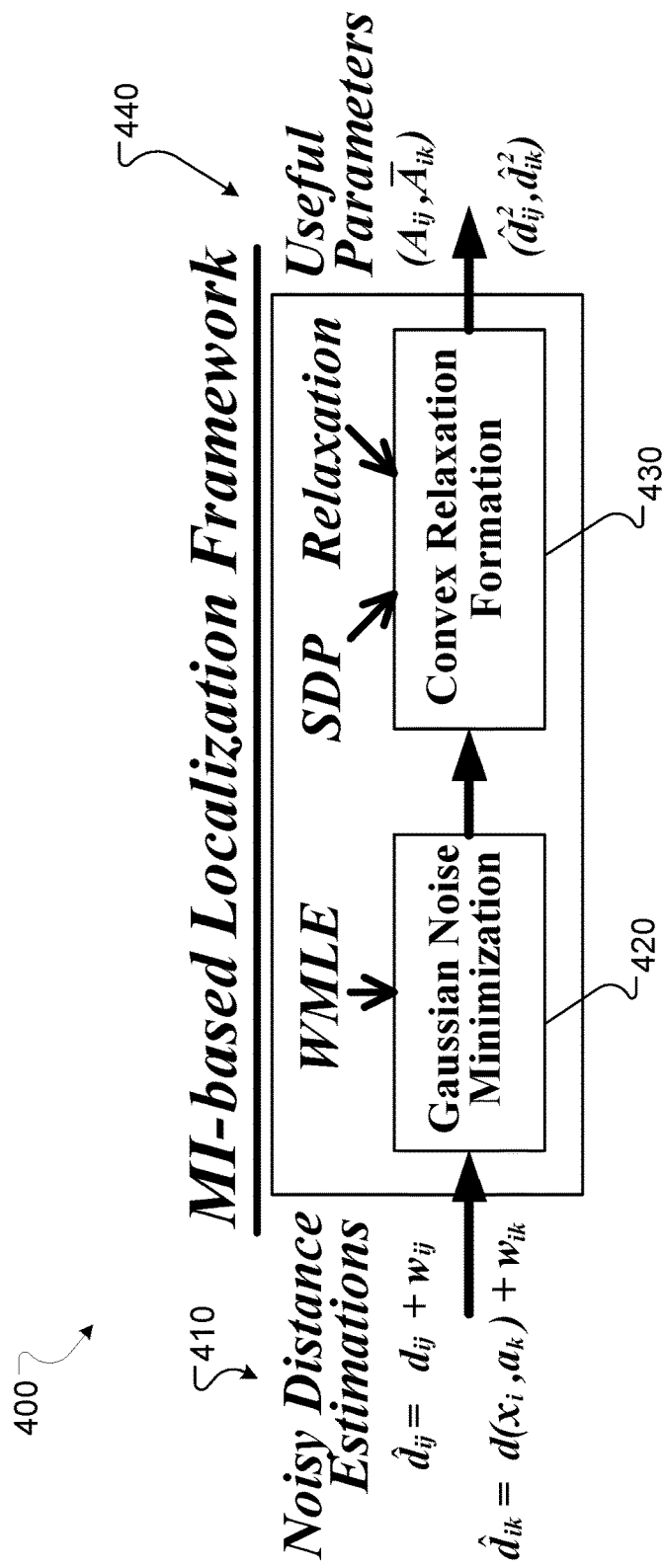
FIG. 4 is a flow chart of an example process of MI-based localization framework.

FIG. 4 is a diagram showing an example process 400 of MI-based localization framework. The example MI-based localization framework takes noisy distance estimation 410 from RMFS measurements as input, applies an ordered sequence of algorithms (for example, joint WMLE 420 and SDP relaxation 430), and produces useful parameters 440 for accurate sensor positioning. The WMLE 420 deals with distance estimation errors. The SDP relaxation 430 reformulates the localization problem into a convex relaxation problem.

In some implementations, according to the propagation properties of MI-based signals, a joint WMLE and SDP relaxation problem is proposed for the MI-based localization. In particular, the most possible estimation errors come from the background noises. As a result, the estimation errors can be modeled as Gaussian random variables (for example, $w_{ij}, w_{ik}$: N(0, $\sigma_{ij}^2$)) and the estimated distances can be modeled as $\hat{d}_{ij} = d_{ij} + w_{ij}$, $\hat{d}_{ik} = d(X_i, a_k) + w_{ik}$. The WMLE 420 is proposed to minimize the mismatch between pairwise and estimated distances from the formulation of likelihood function. The SDP relaxation 430 is further proposed to reformulate the WMLE problem into a convex relaxation problem to reconstruct and relax the original structured problem into a solvable problem from a desired mathematical structure. As a result, several parameters are provided. The parameters include $A_{ij}$, $\overline{A}_{ik}$, that characterize the connections among sensors and anchor devices. The parameters also include $\hat{d}_{ij}^2$, $\hat{d}_{ik}^2$, the estimated distances for the usage in designing an accurate localization algorithm.

Figure 5:
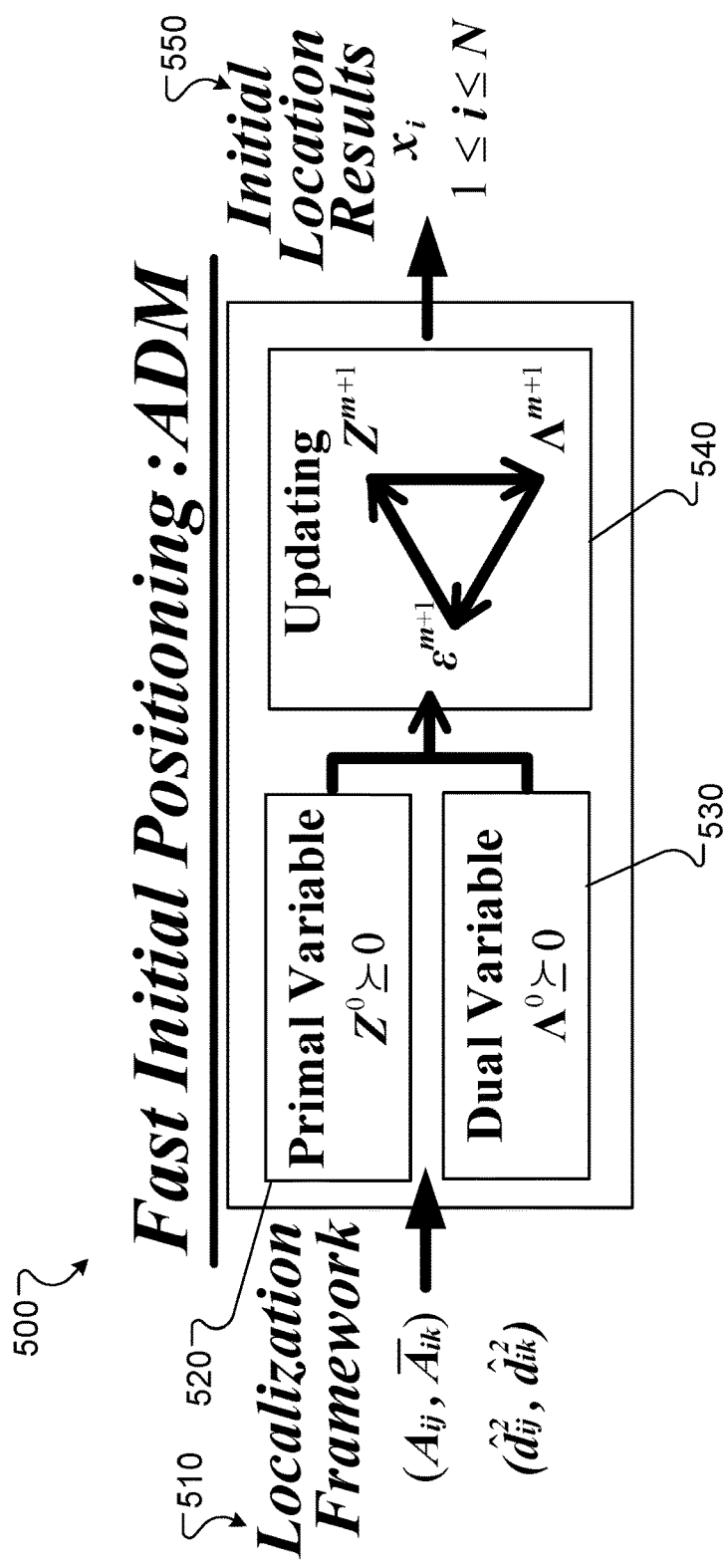
FIG. 5 is a flow chart of an example process of fast initial positioning from alternating direction augmented Lagrangian method (ADM).

FIG. 5 is diagram showing an example process 500 of fast initial positioning from ADM. The example process 500 utilizes the parameters 510 given by the MI-based localization framework for the design of fast initial positioning, formulates primal variable 520 and dual variable 530 to enable the fast algorithm (for example, ADM) for the joint WMLE and SDP relaxation problem, and derives the updating rules 540 of primal and dual variables to obtain initial sensor locations 550 in a time-efficient manner.

In some implementations, when the number of constraints of the SDP problem approaches the order of unknown parameters, interior point methods become impractical both in terms of computation time and storage at each iteration.

On the other hand, ADM, a fast first-order method, provides much less computation time and storage and can take advantage of problem structure such as sparsity. Thus, ADM is more suitable and sometimes the only practical choice for solving large-scale SDPs. The MI-based localization examines the standard form of localization SDP relaxation and proposes a fast initial positioning through ADM for such a standard SDP. In particular, the primal variable Z 520 and dual variable $\Lambda$ 530 are formed, the corresponding augmented Lagrangian function is derived, and the updating rules 540 are calculated to complete the design of the fast initial positioning. An example ADM (that is, Algorithm 1) is shown in FIG. 6 for the fast initial positioning.

FIG. 6 is a diagram showing an example ADM 600, a fast initial positioning algorithm. The example ADM 600 (for example, Algorithm 1) can converge to the optimal solutions at rate O(1/m), where m is the number of applied iterations.

Figure 7:
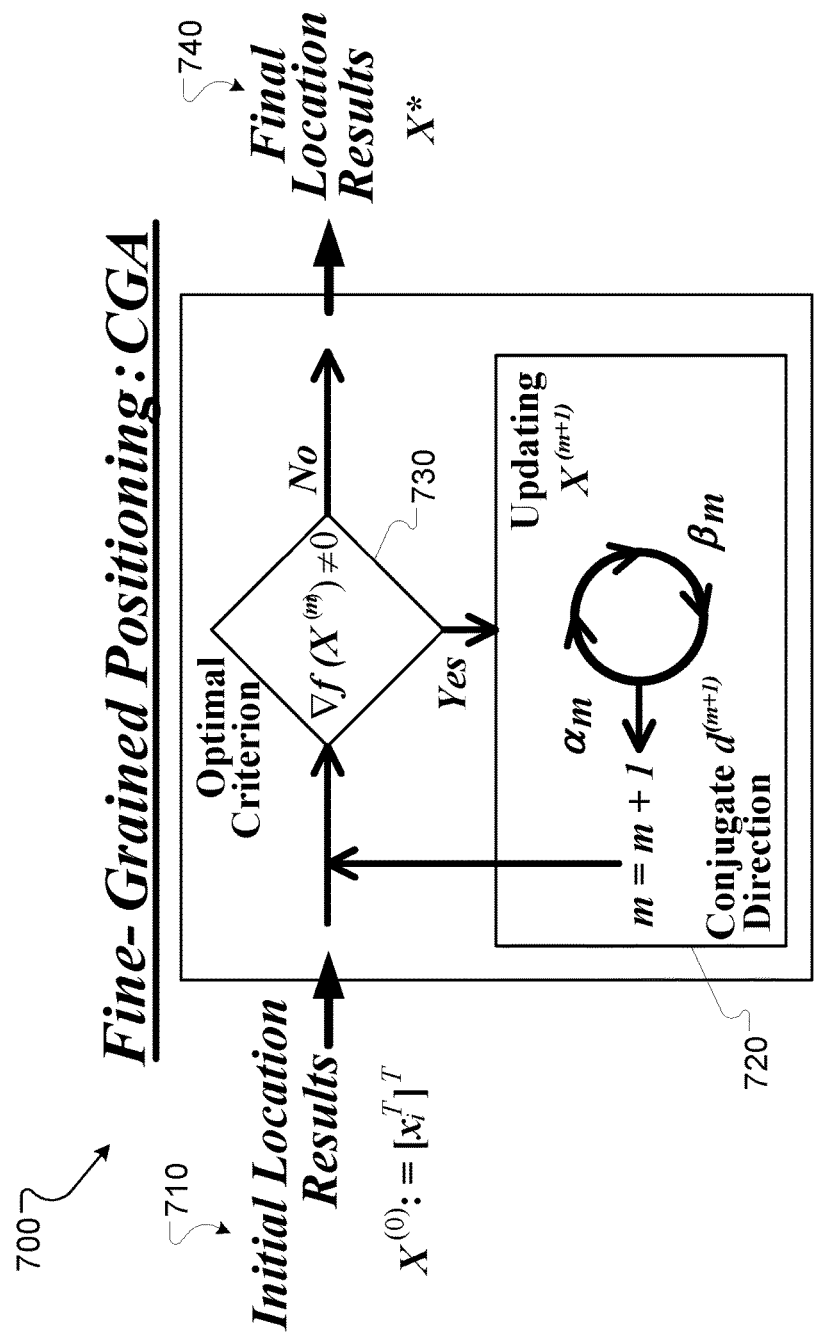
FIG. 7 is a flow chart of an example process of fine-grained positioning from conjugate gradient algorithm (CGA).

FIG. 7 is diagram showing an example process 700 of fine-grained positioning from CGA. The example process 700 refines the initial location results 710 from ADM through the design of fine-grained positioning, formulates the optimal criterion 730 of best estimated locations by examining the gradient of WMLE objective function, derives the updating iterations 720 with the construction of conjugate directions for an efficient optimal point searching (for example, CGA), and provides final accurate location results 740.

In some implementations, after solving the SDP relaxation from the proposed ADM, the solution obtained from SDP relaxation has the high-rank property. For example, in 2D reservoir fracture, the high-rank optimal solution from the proposed ADM should be translated into 2D location solution without losing the optimality. In other words, the sensor positioning can be fine-tuned to increase the location accuracy further, based on the results of fast initial positioning. This can be realized through the design of searching algorithm for the optimal location solution in the correct dimensionality. The MI-based localization uses a sophisticated searching approach of CGA with the help of constructing conjugate direction (CD) to outperform the conventional steepest descent (SD) method. In particular, given V) from the ADM, the searching iteration follows $X^{(m+1)} = X^{(m)} + \alpha_m d^{(m)}$, where $d^{(0)} = -\nabla f(X^{(0)})$ applies the gradient direction for the first iteration and $f(\bullet)$ is the WMLE objective function. The step size $\alpha_m$ is determined by $\alpha_m = \operatorname{argmin}_{\alpha \geq 0} \Phi_m(\alpha)$, where $\Phi_m(\bullet)$ is defined as $\Phi_m(\alpha) := f(X^{(m)} + \alpha d^{(m)})$. If CGA does not approach the minimum point after the current iteration, it constructs the next conjugate direction $d^{(m+1)}$ from the current direction $d^{(m)}$ by $d^{(m+1)} = -\nabla f(X^{(m+1)}) + \beta_m d^{(m)}$, where $\beta_m$ is obtained via the conjugate concept by Fletcher-Reeves as $\beta_m = \|\nabla(X^{(m+1)})\|^2 / \|\nabla f(X^{(m)})\|^2$. An example CGA (that is, Algorithm 2) is shown in FIG. 8 for the fine-grained positioning. The proposed MI-based localization solves the joint WMLE and SDP problem of the MI-based localization through the successive execution of the proposed ADM in Algorithm 1 and CGA in Algorithm 2.

FIG. 8 is a diagram showing an example CGA 800, a fine-grained positioning algorithm.

Figure 9:
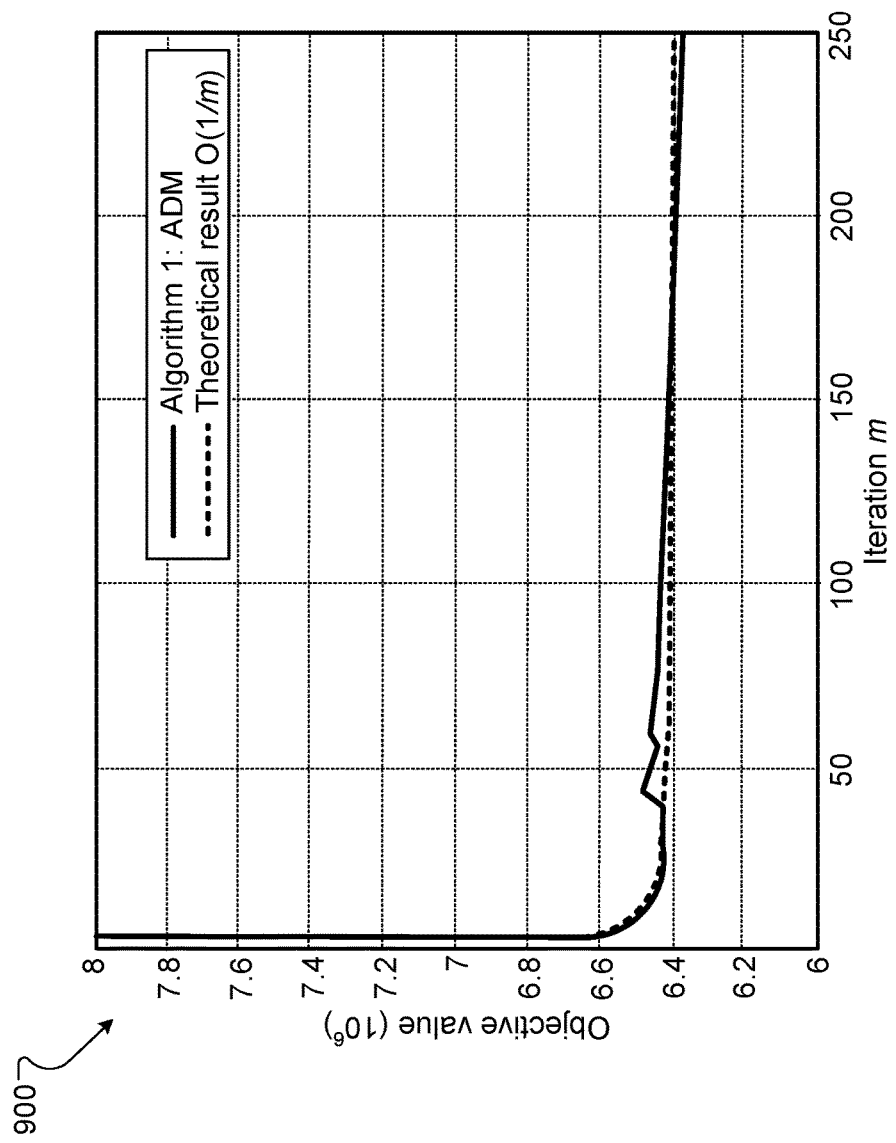
FIG. 9 is a plot showing example effects of the fast convergence of Algorithm 1 shown in FIG. 6.

FIG. 9 is a plot 900, showing example effects of the fast convergence of Algorithm 1 shown in FIG. 6. The Algorithm 1 is simulated within a 2D oil reservoir fracture under 10% channel estimation errors. There are 60 randomly distributed sensors with transmission range of 3.2 m (meter), and two fixed anchor devices whose transmission rage covers the entire sensor area. As shown in FIG. 9, the convergence rate of the Algorithm 1 matches the theoretical result O(1/m). The proposed ADM (for example, the Algorithm 1) provides satisfactory results after 100 iterations. In some implementations, a condition of 100 iterations serves as a desired stopping point.

Figure 10:
FIG. 10 is a table showing example parameter setup for performance evaluation of the MI-based localization under various environmental conditions in underground oil reservoirs.

The performance evaluation is simulated in a practical setting of a 2D oil reservoir fracture. In the simulation, there are two anchor devices inside a single drilling well and 20 sensors are randomly deployed in an 8×8 m² (square meter) area. Each anchor device has direct communication links to every sensor due to its larger transmission range, and each sensor's transmission range R is set to 3.2 m. FIG. 10 is a table 1000 showing example parameter setup for performance evaluation of the MI-based localization under various environmental conditions in underground oil reservoirs. The corresponding environment setup of oil reservoir matches realistic settings like high temperature, small coil antennas, etc. In addition, to characterize the noise level from the estimation errors, noise factor (nf) is defined as $\hat{d}_{ij}=d_{ij}(1+N(0,1)\times nf)$, which is a given number between [0, 1] to control the amount of noise variance. Moreover, to characterize the positioning accuracy by measuring the estimation mismatch, the root-mean-square distance (RMSD) metric is defined as $RMSD=(\Sigma_{i=1}^{N}\|x_i-\hat{x}_i\|^2)^{1/2}/\sqrt{N}$, where x is the actual sensor location and $\hat{x}$ is the one obtained from the localization algorithm.

Figure 11:
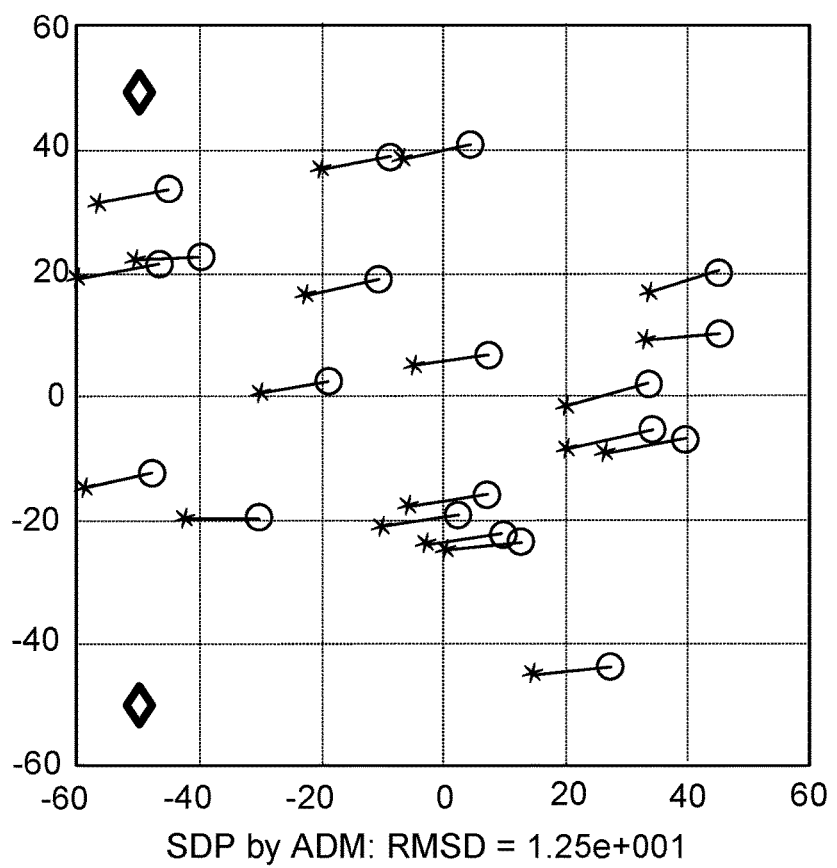
FIG. 11 is a plot showing example localization performance after the example ADM-based fast initial positioning algorithm.

FIG. 11 is a plot 1100 showing example localization performance after the example ADM-based fast initial positioning algorithm (for example, Algorithm 1 as shown in FIG. 6). For high noise level (for example, nf=1), the location mismatch error is large and becomes non-negligible for initial results after the initial positioning algorithm.

Figure 12:
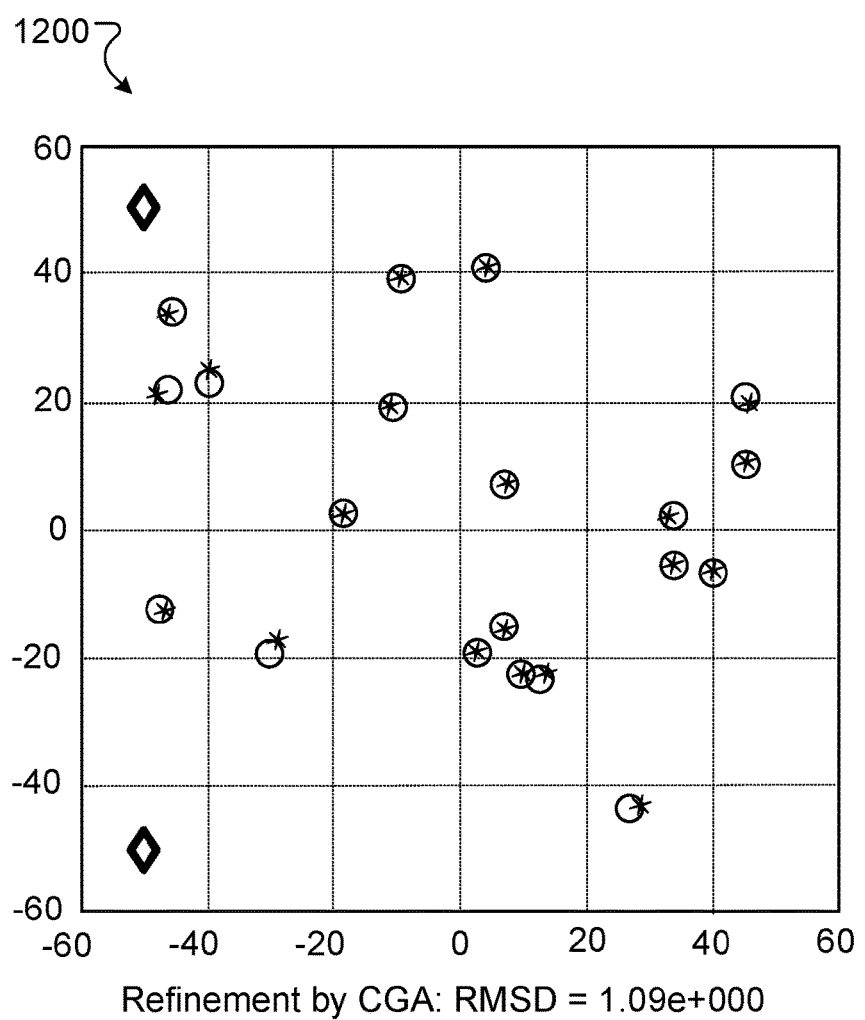
FIG. 12 is a plot showing example localization performance after the example ADM-based fast initial positioning algorithm and the example CGA.

FIG. 12 is a plot 1200 showing example localization performance after the example ADM-based fast initial positioning algorithm and the example CGA (for example, Algorithm 1 as shown in FIG. 6+Algorithm 2 as shown in FIG. 8). For high noise level (for example, nf=1), the fine-grained positioning enhances the location accuracy on the initial results with fast one-dimensional searching algorithm.

Figure 13:
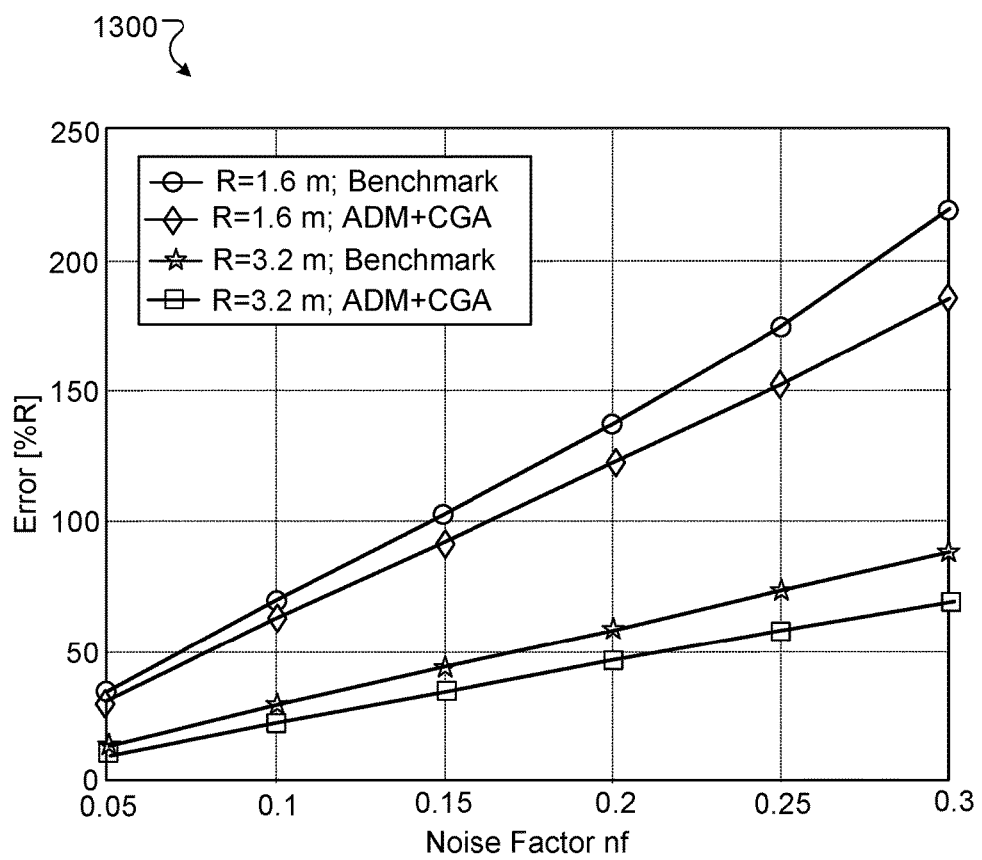
FIG. 13 is a plot showing example estimation errors of the MI-based localization and the semi-definite programming (SDP) relaxation/steepest descent (SD) method under different sensor transmission ranges in low noise regime.
Figure 14:
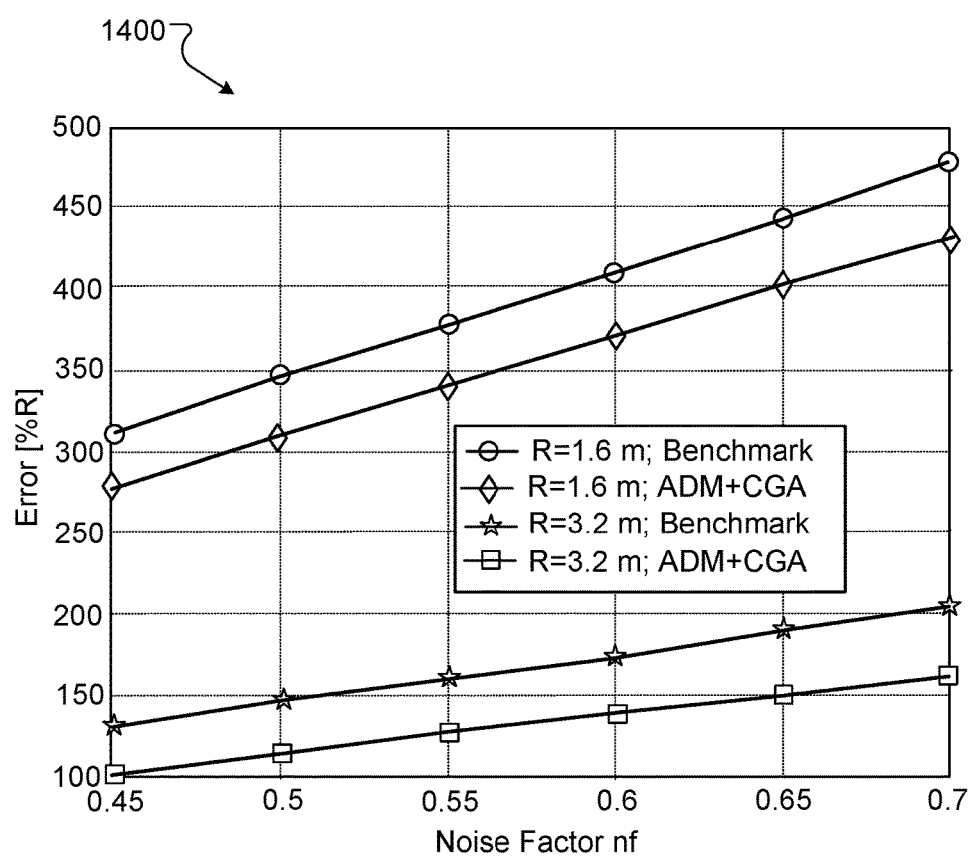
FIG. 14 is a plot showing example estimation errors of the MI-based localization and the SDP relaxation/SD method under different sensor transmission ranges in high noise regime.

FIG. 13 is a plot 1300 showing example estimation errors of the MI-based localization and the semi-definite programming (SDP) relaxation/steepest descent (SD) method (for example, the benchmark) under different sensor transmission ranges in low noise regime. FIG. 14 is a plot 1400 showing example estimation errors of the MI-based localization and the SDP relaxation/SD method under different sensor transmission ranges in high noise regime. In the SDP relaxation/SD method, the localization problem is also formulated as a SDP relaxation, and the SD method is applied to refine the initial results. In some implementations, the SDP relaxation/SD method can provide the least acceptable performance, and thus give the performance benchmarks. In the performance comparison, 60 sensors are randomly deployed. The location estimation error is calculated as a percentage of sensor's transmission range. For both 1.6 m and 3.2 m transmission range, the MI-based localization has less estimation error than the SDP relaxation/SD method, and thus outperforms the benchmark method under all evaluated noise factors.

Figure 15:
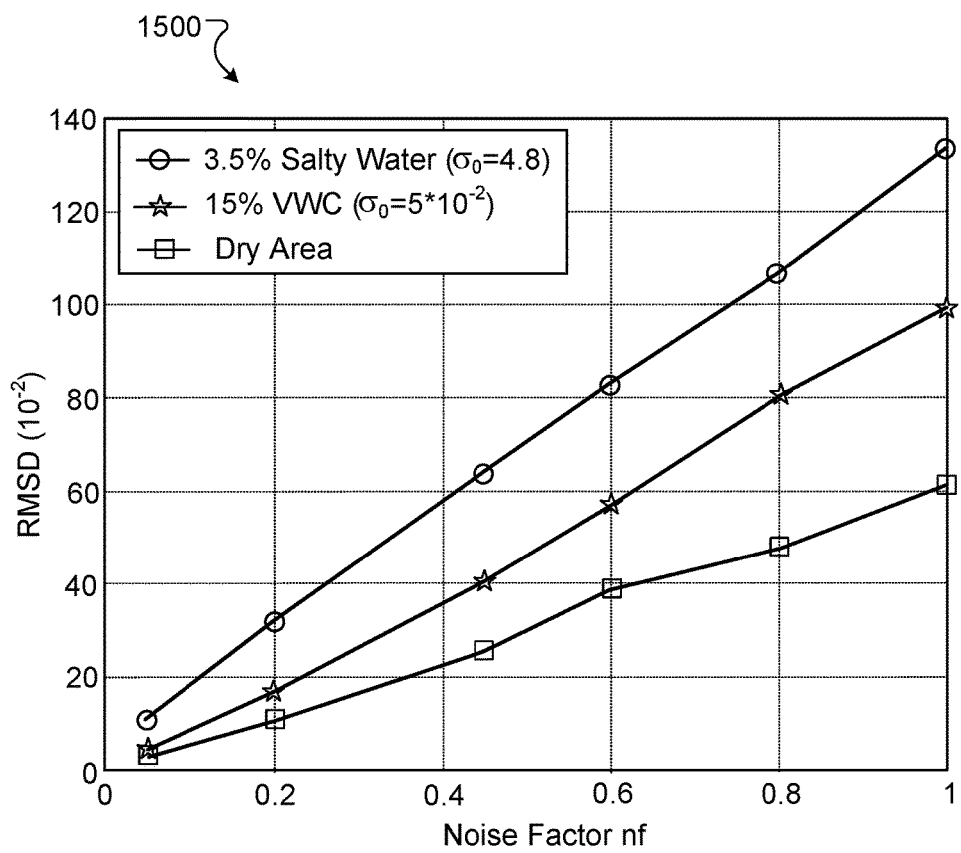
FIG. 15 is a plot showing example conductivity impact on the localization performance of the MI-based localization in oil reservoir environment.

The MI-based localization is further evaluated for the underground environment with varying medium conductivity. While the MI-based communication is adopted for its suitableness in underground environments, the water content in the surrounding areas can affect the communication quality. In particular, if there are more electrolytes in the underground environments, the induction-based communication and thus the MI-based localization can be dramatically degraded. In the evaluation, 60 sensors are randomly deployed in oil reservoirs, and each sensor can tolerate a maximum path loss of 120 dB. FIG. 15 is a plot 1500 showing example conductivity impact from different water contents on the localization performance of the MI-based localization in oil reservoir environment. In particular, the salty water provides great signal conductivity, impairs the signal induction, and thus gives the worst RMSD values. When the noise level is extremely low (for example, nf=0.05), the localization result of 15% Volumetric Water Content (VWC) can approach the localization result of a dry area. As the noise level increases, the performance difference increases between the wet and dry areas.

Figure 16:
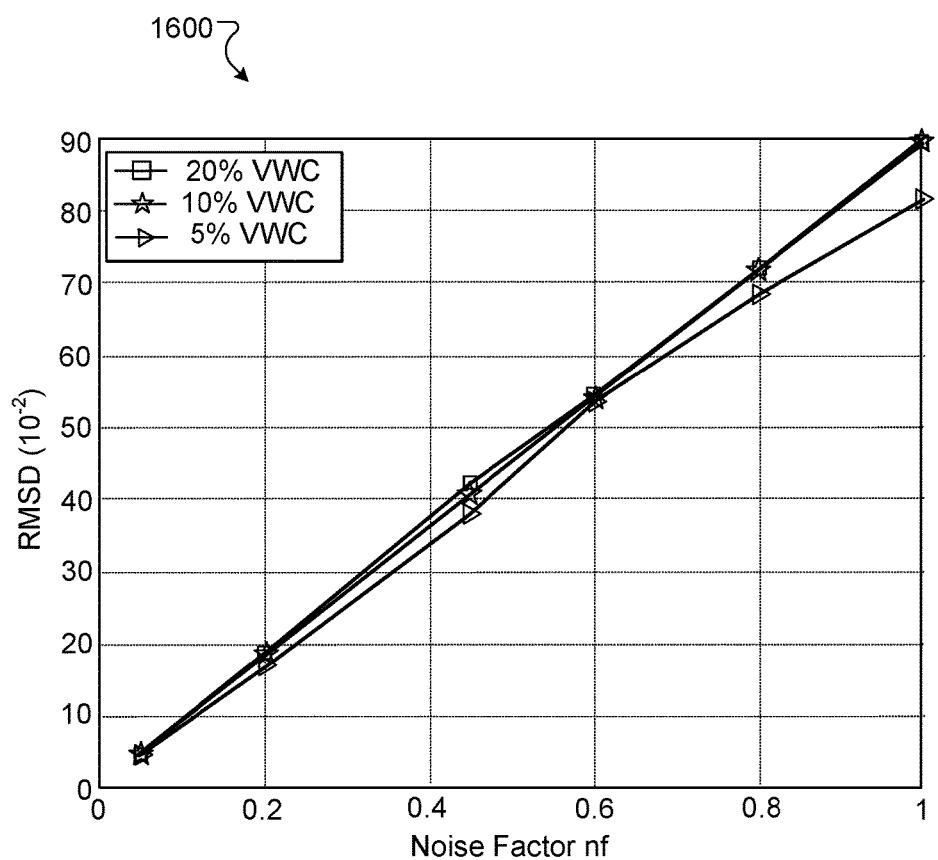
FIG. 16 is a plot showing example volumetric water content (VWC) impact on the localization performance of the MI-based localization in oil reservoir environment.

FIG. 16 is a plot 1600 showing example VWC impact on the localization performance of the MI-based localization in an oil reservoir environment. The water content is set with conductivity $\sigma_0=5\times 10^{-2}$, where $\sigma_0$ is the electrical conductivity at 20° C. As the VWC increases, the performance difference is not obvious, except for very high noise levels. When the noise level is very high (for example, nf=1), larger VWC brings more signal conductivity than induction, damages the communication quality, and thus degrades localization performance.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including, by way of example, a programmable processor, a computer, a system on a chip, or multiple ones, or combinations of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site, or distributed across multiple sites, and interconnected by a communication network.

While this disclosure contains many specific implementation details, these should not be construed as limitations on the scope of any implementations or of what may be claimed, but rather as descriptions of features specific to particular implementations. Certain features that are described in this disclosure in the context of separate implementations can also be implemented in combination, in a single implementation. Conversely, various features that are described in the context of a single implementation can also be implemented in multiple implementations separately or in any suitable subcombination. Moreover, although features may be described previously as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described previously should not be understood as requiring such separation in all implementations, and it should be understood that the described program components and systems can, generally, be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
obtaining a set of distances, wherein the set of distances represents an estimate of distances between a plurality of sensors and at least two anchor devices in a wireless underground sensor network (WUSN) in a hydrocarbon reservoir, and locations of the at least two anchor devices are known;
establishing an MI-based localization framework by first applying a weighted maximum likelihood estimation (WMLE) and then applying a semi-definite programming (SDP) relaxation to the set of distances and the known locations of the at least two anchor devices;
after establishing the MI-based localization framework, determining a first set of sensor locations, wherein the determined first set of sensor locations represents a first estimate of locations of the plurality of sensors; and
after determining the first set of sensor locations, determining a second set of sensor locations based on the determined first set of sensor locations, wherein the determined second set of sensor locations represents a second estimate of locations of the plurality of sensors.

2. The method of claim 1, wherein determining the first set of sensor locations comprises applying an alternating direction augmented Lagrangian method (ADM) to the established MI-based localization framework.

3. The method of claim 2, wherein determining the second set of sensor locations comprises applying a conjugate gradient algorithm (CGA) to the determined first set of sensor locations.

4. The method of claim 1, wherein the first estimate of locations is a coarse estimate while the second estimate of locations is a fine estimate, and the determined second set of sensor locations is more accurate than the determined first set of sensor locations.

5. The method of claim 1, wherein the plurality of sensors are disposed at respective sensor locations within the hydrocarbon reservoir, and the at least two anchor devices are disposed at respective anchor device locations on a dipole antenna inside the hydrocarbon reservoir.

6. The method of claim 5, wherein the dipole antenna is disposed inside a drilling well on the hydrocarbon reservoir, one anchor device is placed on top of the dipole antenna inside the hydrocarbon reservoir, and another anchor device is placed on bottom of the dipole antenna inside the hydrocarbon reservoir.

7. The method of claim 1, further comprising generating a fracture map of the hydrocarbon reservoir based on at least the determined second set of sensor locations.

8. A non-transitory computer-readable medium storing instructions executable by a computer system to perform operations comprising:
obtaining a set of distances, wherein the set of distances represents an estimate of distances between a plurality of sensors and at least two anchor devices in a wireless underground sensor network (WUSN) in a hydrocarbon reservoir, and locations of the at least two anchor devices are known;
establishing an MI-based localization framework by first applying a weighted maximum likelihood estimation (WMLE) and then applying a semi-definite programming (SDP) relaxation to the set of distances and the known locations of the at least two anchor devices;
after establishing the MI-based localization framework, determining a first set of sensor locations, wherein the determined first set of sensor locations represents a first estimate of locations of the plurality of sensors; and
after determining the first set of sensor locations, determining a second set of sensor locations based on the determined first set of sensor locations, wherein the determined second set of sensor locations represents a second estimate of locations of the plurality of sensors.

9. The non-transitory computer-readable medium of claim 8, wherein determining the first set of sensor locations comprises applying an alternating direction augmented Lagrangian method (ADM) to the established MI-based localization framework.

10. The non-transitory computer-readable medium of claim 9, wherein determining the second set of sensor locations comprises applying a conjugate gradient algorithm (CGA) to the determined first set of sensor locations.

11. The non-transitory computer-readable medium of claim 8, wherein the first estimate of locations is a coarse estimate while the second estimate of locations is a fine estimate, and the determined second set of sensor locations is more accurate than the determined first set of sensor locations.

12. The non-transitory computer-readable medium of claim 8, wherein the plurality of sensors are disposed at respective sensor locations within the hydrocarbon reservoir, and the at least two anchor devices are disposed at respective anchor device locations on a dipole antenna inside the hydrocarbon reservoir.

13. The non-transitory computer-readable medium of claim 12, wherein the dipole antenna is disposed inside a drilling well on the hydrocarbon reservoir, one anchor device is placed on top of the dipole antenna inside the hydrocarbon reservoir, and another anchor device is placed on bottom of the dipole antenna inside the hydrocarbon reservoir.

14. The non-transitory computer-readable medium of claim 8, the operations further comprising generating a fracture map of the hydrocarbon reservoir based on at least the determined second set of sensor locations.

15. A device comprising:
a memory; and
a processing unit that is arranged to perform operations including:
obtaining a set of distances, wherein the set of distances represents an estimate of distances between a plurality of sensors and at least two anchor devices in a wireless underground sensor network (WUSN) in a hydrocarbon reservoir, and locations of the at least two anchor devices are known;
establishing an MI-based localization framework by first applying a weighted maximum likelihood estimation (WMLE) and then applying a semi-definite programming (SDP) relaxation to the set of distances and the known locations of the at least two anchor devices;
after establishing the MI-based localization framework, determining a first set of sensor locations, wherein the determined first set of sensor locations represents a first estimate of locations of the plurality of sensors; and
after determining the first set of sensor locations, determining a second set of sensor locations based on the determined first set of sensor locations, wherein the determined second set of sensor locations represents a second estimate of locations of the plurality of sensors.

16. The device of claim 15, wherein determining the first set of sensor locations comprises applying an alternating direction augmented Lagrangian method (ADM) to the established MI-based localization framework.

17. The device of claim 16, wherein determining the second set of sensor locations comprises applying a conjugate gradient algorithm (CGA) to the determined first set of sensor locations.

18. The device of claim 15, wherein the first estimate of locations is a coarse estimate while the second estimate of locations is a fine estimate, and the determined second set of sensor locations is more accurate than the determined first set of sensor locations.

19. The device of claim 15, wherein the plurality of sensors are disposed at respective sensor locations within the hydrocarbon reservoir, and the at least two anchor devices are disposed at respective anchor device locations on a dipole antenna inside the hydrocarbon reservoir.

20. The device of claim 19, wherein the dipole antenna is disposed inside a drilling well on the hydrocarbon reservoir, one anchor device is placed on top of the dipole antenna inside the hydrocarbon reservoir, and another anchor device is placed on bottom of the dipole antenna inside the hydrocarbon reservoir.

* * * * *